United States Patent
Nosaka et al.

(10) Patent No.: US 9,090,174 B2
(45) Date of Patent: Jul. 28, 2015

(54) POWER SUPPLY DEVICE AND POWER SUPPLY METHOD

(75) Inventors: Shigekiyo Nosaka, Fukuoka (JP); Yuji Igata, Fukuoka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 233 days.

(21) Appl. No.: 13/993,298

(22) PCT Filed: Dec. 15, 2011

(86) PCT No.: PCT/JP2011/007016
§ 371 (c)(1),
(2), (4) Date: Jun. 11, 2013

(87) PCT Pub. No.: WO2012/081253
PCT Pub. Date: Jun. 21, 2012

(65) Prior Publication Data
US 2013/0257345 A1    Oct. 3, 2013

(30) Foreign Application Priority Data
Dec. 17, 2010   (JP) .................... 2010-281596

(51) Int. Cl.
*H02J 7/00*  (2006.01)
*B60L 11/18*  (2006.01)
*H01M 10/44*  (2006.01)

(52) U.S. Cl.
CPC ......... *B60L 11/1838* (2013.01); *B60L 11/1816* (2013.01); *B60L 11/1825* (2013.01);
(Continued)

(58) Field of Classification Search
CPC ...... Y02E 60/12; H02J 7/0004; H02J 7/0006; H01M 10/48; H01M 10/4257; Y02T 90/14; Y02T 10/70; Y02T 10/7005; Y02T 10/7011; Y02T 10/7016; Y02T 10/7022
USPC ........................................................ 320/106
See application file for complete search history.

(56) References Cited

U.S. PATENT DOCUMENTS 8,396,683 B2 * 3/2013 Buschnakowski et al. ... 702/127
8,463,472 B2   6/2013 Watanabe
(Continued)

FOREIGN PATENT DOCUMENTS

CN    101801710 A    8/2010
CN    101909926 A    12/2010
(Continued)

OTHER PUBLICATIONS

English Translation of Chinese Search Report dated Jan. 7, 2015, for Corresponding CN Application No. 201180060289.0, 2 pages.
(Continued)

*Primary Examiner* — Arun Williams
(74) *Attorney, Agent, or Firm* — Seed IP Law Group PLLC

(57) ABSTRACT

Provided are a power supply device and a power supply method which can carry out proper charging even when a plurality of electric automobiles are connected to a charging stand. A charging stand (1) supplies power to electric automobiles (2, 3) by way of the charging cables (4, 5). The charging stand (1) is provided with: a charging cable identification signal transmitter (9) for transmitting a charging cable identification signal to the electric automobiles by way of the charging cables (4, 5); an electric automobile identification signal receiver (10) for receiving an electric automobile identification signal and a charging cable identification signal from the electric automobiles (2, 3) by way of the charging cables (4, 5); and a controller (11) for charging the electric automobiles (2, 3) when the electric automobile identification signal receiver (10) receives the electric automobile identification signal and the charging cable identification signal.

12 Claims, 5 Drawing Sheets

(52) U.S. Cl.
CPC ......... *B60L11/1846* (2013.01); *H01M 10/441* (2013.01); *B60L 2230/16* (2013.01); *B60L 2240/80* (2013.01); *H01M 2220/20* (2013.01); *Y02T 10/7005* (2013.01); *Y02T 10/7088* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 30/14* (2013.01)

(56) References Cited

U.S. PATENT DOCUMENTS

| | | | |
|---|---|---|---|
| 2010/0010704 A1* | 1/2010 | Uchida | 701/32 |
| 2010/0145568 A1 | 6/2010 | Watanabe | |
| 2010/0270860 A1 | 10/2010 | Kamaga | |
| 2010/0299008 A1 | 11/2010 | Mitsutani | |
| 2011/0022222 A1 | 1/2011 | Tonegawa | |
| 2011/0127956 A1* | 6/2011 | Mitsutani | 320/109 |
| 2011/0160019 A1* | 6/2011 | Harada | 477/7 |
| 2011/0279082 A1* | 11/2011 | Hagenmaier et al. | 320/109 |

FOREIGN PATENT DOCUMENTS

| | | |
|---|---|---|
| CN | 101909927 A | 12/2010 |
| JP | 2008236902 A | 10/2008 |
| JP | 2010142001 A | 6/2010 |
| JP | 2011083156 A | 4/2011 |

OTHER PUBLICATIONS

Denki Jidosha-yo Conductive Juden System Ippan Yokyu Juiko, Nippon Dendo Sharyo Kyokai Kikaku, JEVS G 109:2001, Zaidan Hojin Nippon Dendo Sharyo Kyokai, Mar. 29, 2001, 75 pages.
International Search Report dated Mar. 27, 2012, for corresponding International Application No. PCT/JP2011/007016, 4 pages.

* cited by examiner

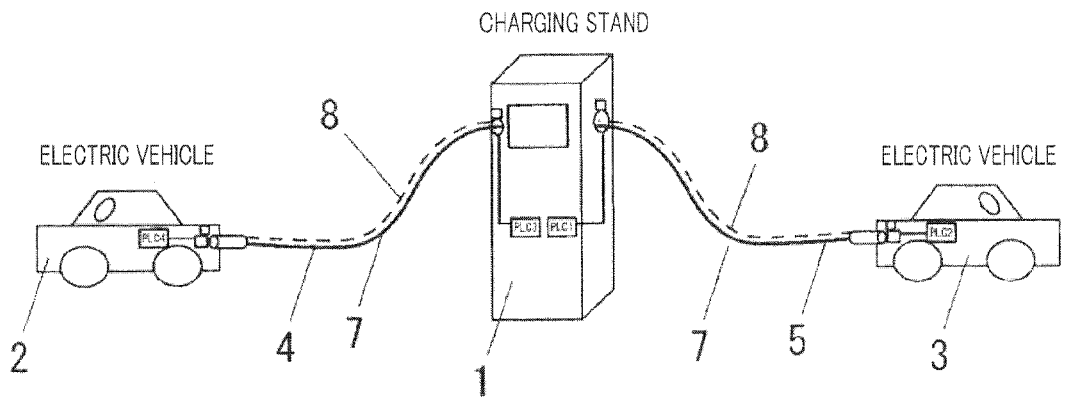

FIG. 1A

IDENTIFICATION CODE TRANSMITTING METHOD 1

USE 1-KHZ PULSE SIGNAL USED IN SAE J1772
VARY INFORMATION TO BE TRANSMITTED, BY DUTY CYCLE

| DUTY CYCLE % | INFORMATION |
|---|---|
| 100 | NO SIGNAL TRANSMITTED STATE: USED AS A STOP BIT |
| 90 | NOT USED |
| 80 | 8 |
| 70 | 7 |
| 60 | 6 |
| 50 | 5 |
| 40 | 4 |
| 30 | 3 |
| 20 | 2 |
| 10 | 1 |
| 0 | NOT USED: USED AS A START BIT |

ELECTRIC VEHICLE:

1. WAIT FOR SIGNAL
   BECAUSE SIGNAL LINE IS IN HIGH STATE

2. TRANSMIT USING DUTY CYCLE OF 0%
   AS THE START BIT

3. DETECT DUTY CYCLE OF 80%

4. DETECT DUTY CYCLE OF 30%

5. SIGNAL RECEPTION COMPLETED
   BECAUSE SIGNAL LINE IS IN HIGH STATE
   (DUTY CYCLE OF 100%)

6. RECEIVE 83 AS AN IDENTIFICATION CODE

*BY PRE-ESTABLISHING THE NUMBER OF
DATA TO BE TRANSFERRED
(2 IN EXAMPLE, BUT MAY BE 3, 4, ⋯)
RECOGNIZE STOP BIT POSITION
AND COMPLETE TRANSFER OF DATA.

FIG. 1B

POWER SUPPLY DEVICE AND POWER SUPPLY METHOD

TECHNICAL FIELD

The present invention relates to a power supply apparatus and a power supply method that charge an electric vehicle.

BACKGROUND ART

In order to enable charging of a plurality of electric vehicles at one location, a power supply apparatus that charges an electric vehicle is configured to include a charging stand having a plurality of charging cables, and a power supplying section that selectively supplies power to the charging cables.

The configuration is such that, when an electric vehicle is connected to a charging cable, first an electric vehicle identification signal of the electric vehicle is transmitted via a charging cable to the power supplying section, followed by recognition of the electric vehicle identification signal by the power supplying section, after which the electric vehicle is charged by the power supplying section, via the charging cable (for example, as in Patent Literature (hereinafter, abbreviated as PTL) 1).

CITATION LIST

Patent Literature

PTL 1
Japanese Patent Application Laid-Open No. 2010-142001

SUMMARY OF INVENTION

Technical Problem

In the power supply apparatus described in PTL 1, however, when a plurality of electric vehicles are connected to the charging stand, proper charging is not possible.

That is, because the charging stand has a plurality of charging cables, there may be times when a plurality of electric vehicles are simultaneously connected to the charging stand. When this occurs, there is mutual interference between the electric vehicle identification signals transmitted to the power supplying section via the charging cables. As a result, the power supplying section cannot determine which vehicle connected to a charging cable the received signal is from. As a result, there is a problem of not being able to perform charging properly.

An object of the present invention is to provide a power supply apparatus and a power supply method capable of proper charging even when a plurality of electric vehicles are connected to a charging stand.

Solution to Problem

A power supply apparatus according to an aspect of the present invention is a power supply apparatus to which a plurality of charging cables are connected and which supplies power to an electric vehicle via a corresponding one of the charging cables, the apparatus including: a transmitting section that transmits a charging cable identification signal to the electric vehicle via the charging cable; a receiving section that receives an electric vehicle identification signal and the charging cable identification signal from the electric vehicle via the charging cable; and a control section that charges the electric vehicle upon reception of the electric vehicle identification signal and the charging cable identification signal by the receiving section.

A power supply method according to an aspect of the present invention is a power supply method that supplies power to an electric vehicle via a corresponding one of a plurality of charging cables, the method including: transmitting a charging cable identification signal to the electric vehicle via the charging cable; receiving an electric vehicle identification signal and the charging cable identification signal from the electric vehicle via the charging cable; and charging the electric vehicle.

Advantageous Effects of Invention

According to the present invention, proper charging can be performed even when a plurality of electric vehicles are connected to the charging stand.

That is, even when a plurality of electric vehicles are connected to the charging stand, no interference occurs between electric vehicle identification signals. As a result, it is possible to properly determine which electric vehicle connected to a charging cable the electric vehicle identification signal that has been received at the power supplying section is from, thus enabling proper charging.

BRIEF DESCRIPTION OF DRAWINGS

FIG. 1 is a configuration diagram of a power supply apparatus according to an embodiment of the present invention;

DESCRIPTION OF EMBODIMENTS

Embodiment

An embodiment of the present invention will be described in detail below, with reference to the drawings.

Figure 2:
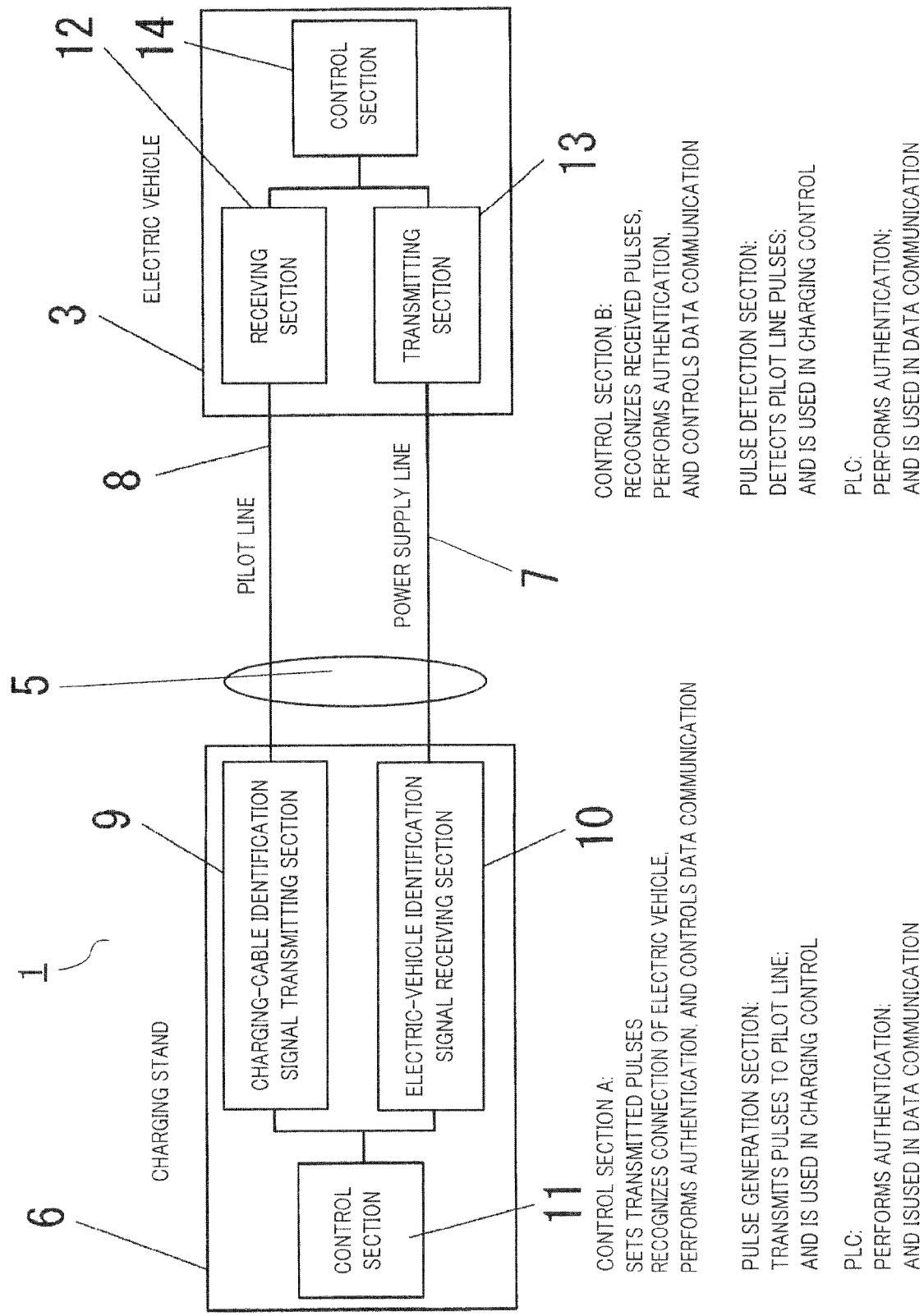
FIG. 2 is a block diagram of the power supply apparatus according to the embodiment of the present invention.

FIG. 1 is a drawing showing the configuration of a power supply apparatus according to an embodiment of the present invention. FIG. 1A shows the configuration of the power supply apparatus, and FIG. 1B describes the method of transmitting the identification code of the power supply apparatus. FIG. 2 is a block diagram of the power supply apparatus.

As shown in FIG. 1A, charging stand 1 (power supply apparatus) is installed in an existing gasoline station, supermarket, or home. Charging stand 1 has a plurality of charging cables 4, 5 enabling simultaneous charging of a plurality of electric vehicles 2, 3.

As shown in FIG. 2, charging stand 1 has power supplying section 6 that selectively supplies power to charging cables 4, 5.

In FIG. 2, although charging cable 4 is not shown to avoid complexity, charging cable 4 includes the same configuration as charging cable 5.

Charging cable 4, similar to charging cable 5, includes: power supply line 7 that charges electric vehicle 2 connected to charging cable 4; and pilot line 8 that indirectly detects the connection of power supplying section 6 and charging cable 4 via power supply line 7.

Charging cable 5 includes: power supply line 7 that charges electric vehicle 3 connected to charging cable 5; and pilot line 8 that indirectly detects the connection of power supplying section 6 and charging cable 5 via power supply line 7.

Power supplying section 6 includes: charging-cable identification signal transmitting section 9 that transmits a charging cable identification signal for each of charging cables 4 and 5 to pilot line 8; electric-vehicle identification signal receiving section 10 that receives the electric vehicle identification signal sent as a reply from electric vehicle 3 (or electric vehicle 2) via pilot line 7; and control section 11 connected to electric-vehicle identification signal receiving section 10 and charging-cable identification signal transmitting section 9.

(Charging Cables 4, 5)

Charging cables 4, 5 each include pilot line 8 and power supply line 7, and charging-cable identification signal transmitting section 9 transmits a charging cable identification signal to electric vehicles 2, 3 via pilot line 8, and charging stand 1 supplies power to electric vehicles 2, 3 via power supply line 7.

(Charging-Cable Identification Signal Transmitting Section 9)

Charging-cable identification signal transmitting section 9 transmits a charging cable identification signal to the electric vehicle via charging cables 4, 5.

When the voltage on pilot line 8 is detected by control section 11, charging-cable identification signal transmitting section 9 transmits the charging cable identification signal to the electric vehicles 2, 3 via pilot lines 8.

When electric-vehicle identification signal receiving section 10 receives no reception response signal with respect to the electric vehicle identification signal or the charging cable identification signal within a prescribed amount of time, charging-cable identification signal transmitting section 9 retransmits the charging cable identification signal to electric vehicles 2, 3.

The retransmitted charging cable identification signal may have information that is different from a charging cable identification signal transmitted before the retransmission.

In this case, charging-cable identification signal transmitting section 9 forms the charging cable identification signal by a pulse signal. Charging-cable identification signal transmitting section 9 forms the charging cable identification signal by varying the pulse duty cycle.

For example, as illustrated in FIG. 1B, a 1-kHz pulse signal used in SAE J1772 is used, and information to be transmitted is varied by the duty cycle.

(Electric-Vehicle Identification Signal Receiving Section 10)

Electric-vehicle identification signal receiving section 10 receives the electric vehicle identification signal and the charging cable identification signal from electric vehicles 2, 3, via charging cables 4, 5.

Specifically, electric-vehicle identification signal receiving section 10 receives the electric vehicle identification signals from electric vehicles 2, 3 via power supply lines 7, and receives the charging cable identification signal from the electric vehicles via pilot lines 8.

(Control Section 11)

When electric-vehicle identification signal receiving section 10 receives the electric vehicle identification signal and the charging cable identification signal, control section 11 controls the operation so as to charge electric vehicles 2, 3.

Meanwhile, electric vehicle 3 (or electric vehicle 2) includes: receiving section 12 that receives the charging cable identification signal for each of charging cables 4, 5 transmitted via pilot line 8; transmitting section 13 that transmits the electric vehicle identification signal to electric-vehicle identification signal receiving section 10 via power supply line 7; and control section 14 connected to receiving section 12 and transmitting section 13.

A power line communication (PLC) technique is applied, in which transmitting and receiving are performed between electric-vehicle identification signal receiving section 10 and transmitting section 13 while a signal is superimposed on a charging current supplied via power supply line 7.

The operation of the power supply apparatus configured as described above will be described below.

As shown in FIG. 1A, in the condition in which electric vehicle 2 is connected to charging stand 1 via charging cable 4 while electric vehicle 3 is connected thereto via charging cable 5 at the same time, the plurality of electric vehicles 2 and 3 are properly charged simultaneously by the following operation.

In this case, the same is performed at both electric vehicles 2 and 3, so that an example regarding communication with electric vehicle 3 will be representatively provided as shown in FIG. 2.

Figure 3A:
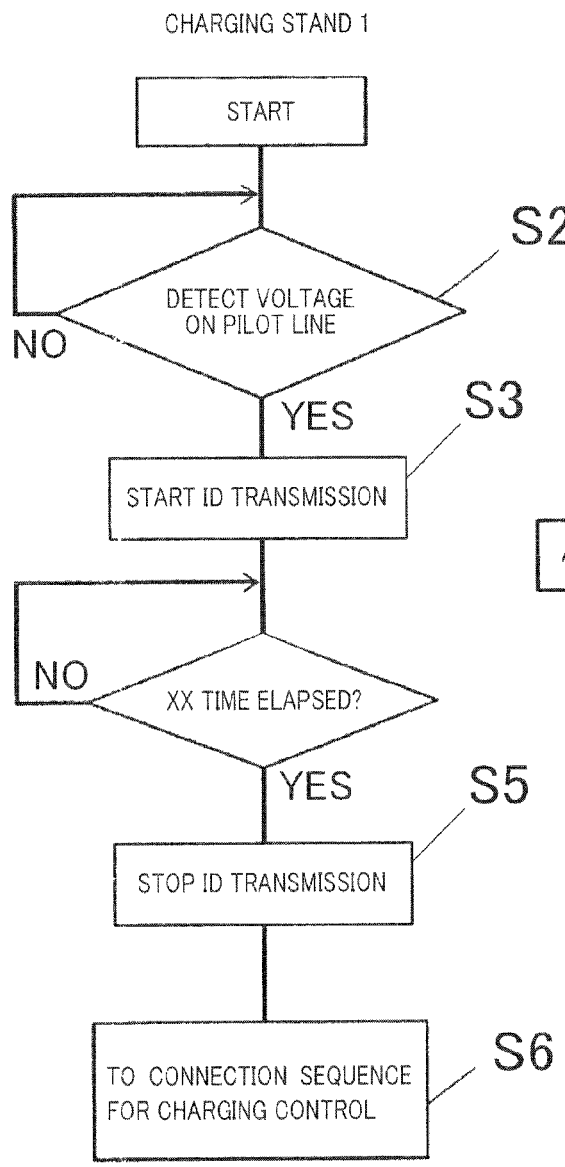
FIGS. 3A and 3B are flowcharts showing the operation of the power supply apparatus according to the embodiment of the present invention.
Figure 3B:
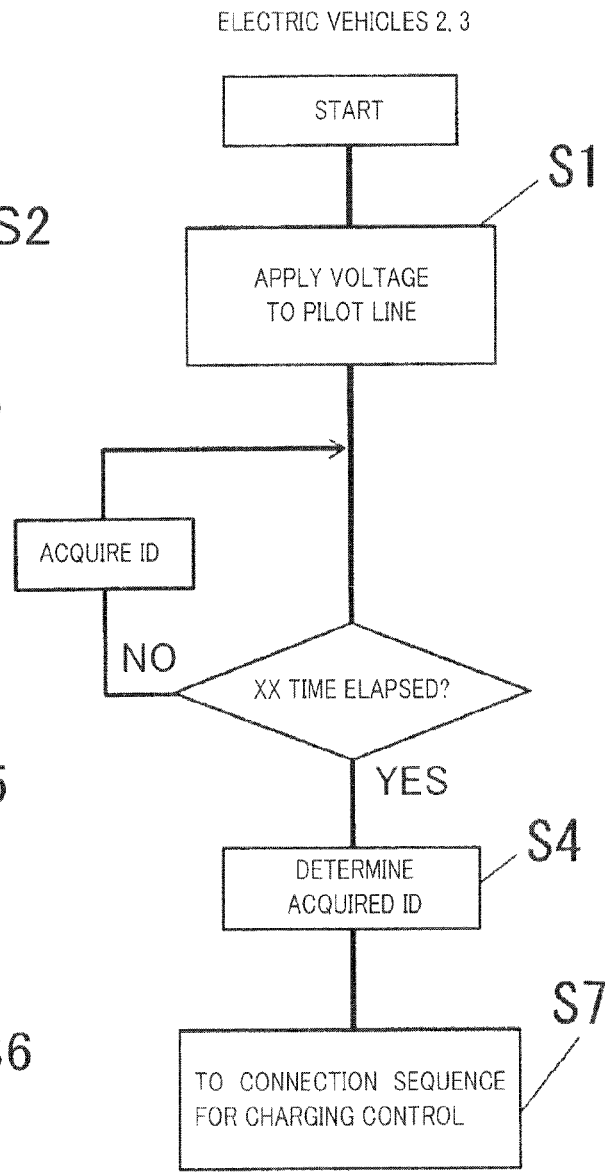

FIGS. 3A and 3B are flowcharts showing the operation of the power supply apparatus, FIG. 3A showing the operation of control section 11 of charging stand 1, and FIG. 3B showing the operation of control section 14 of electric vehicle 3 (or electric vehicle 2). In the drawing, S denotes steps in the flow.

First, when the charging plug (not shown) of charging cable 5 is connected to the charging port (not shown) of electric vehicle 3, control section 14 of electric vehicle 3 increases the voltage on pilot line 8 via receiving section 12 (S1 in FIG. 3B).

When this occurs, control section 11 of power supplying section 6 detects that the voltage of charging-cable identification signal transmitting section 9 has increased (S2 in FIG. 3A), and transmits the charging cable identification signal from charging-cable identification signal transmitting section 9 via pilot line 8 to receiving section 12 (S3 in FIG. 3A).

That is, charging stand 1 notifies electric vehicle 3 that connection has been made to charging cable 5. Meanwhile, charging stand 1 notifies electric vehicle 2 that connection has been made to charging cable 4.

When notified of the connection to charging cable 5, electric vehicle 3 receives, at receiving section 12, the charging cable identification signal transmitted from charging-cable identification signal transmitting section 9 via pilot line 8 (S4 in FIG. 3B).

Also, the transmission of the charging cable identification signal from charging-cable identification signal transmitting section 9 via pilot line 8 stops at that timing (S5 in FIG. 3A).

The waiting time from S3 to S5 of FIG. 3A and the waiting time from S1 to S4 in FIG. 3B are, for example, several seconds.

When electric vehicle 3 receives the charging cable identification signal notifying that electric vehicle 3 is connected to charging cable 5, transmitting section 13 of electric vehicle 3 transmits the electric vehicle identification signal to electric-vehicle identification signal receiving section 10 via power supply line 7.

The electric vehicle identification signal to be transmitted from transmitting section 13 of electric vehicle 3 to electric-vehicle identification signal receiving section 10 via power supply line 7 includes the charging cable identification signal notifying that electric vehicle 3 is connected to charging cable 5.

For example, the electric vehicle identification signal is modulated by charging cable identification signal or, conversely, the charging cable identification signal is modulated by the electric vehicle identification signal.

Therefore, control section 11 connected to charging-cable identification signal transmitting section 9 detects and recognizes that electric vehicle 3 is connected to charging cable 5 from that signal and starts charging electric vehicle 3 (S6 in FIG. 3A and S7 in FIG. 3B).

In the present embodiment, control section 11 is configured to recognize the charging cable identification signal from the electric vehicle identification signal received at electric-vehicle identification signal receiving section 10 and to charge electric vehicle 3 via power supply line 7. Thus, proper charging can be performed even when a plurality of electric vehicles 2, 3 are connected to charging stand 1.

Figure 4:
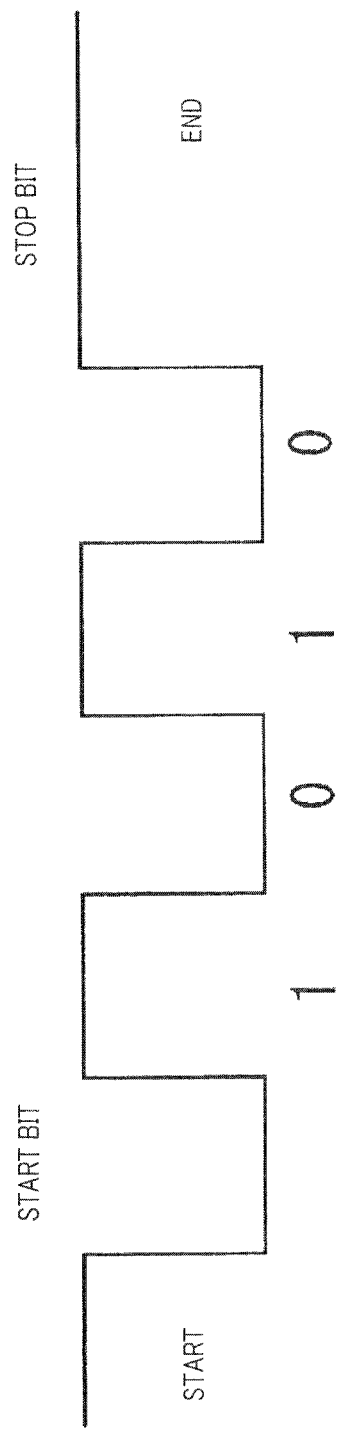
FIG. 4 is a drawing describing the pulse transmission of a charging-cable identification signal transmitting section of the power supply apparatus according to the embodiment of the present invention.
Figure 5:
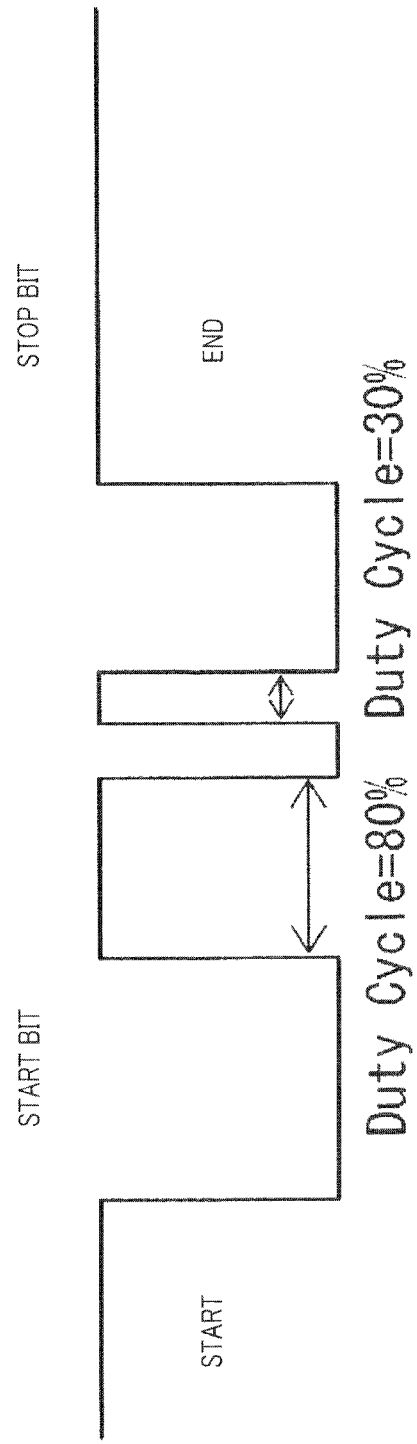
FIG. 5 is a drawing describing a charging cable identification signal of the charging-cable identification signal transmitting section of the power supply apparatus according to the embodiment of the present invention.

FIG. 4 is a drawing describing the pulse transmission of charging-cable identification signal transmitting section 9. FIG. 5 is a drawing describing the charging cable identification signal of charging-cable identification signal transmitting section 9.

As shown in FIG. 4, charging-cable identification signal transmitting section 9 is configured to transmit a pulse. For example, a pulse signal of combinations of ones and zeros of approximately 1 kHz forms the charging cable identification signal.

As shown in FIG. 5, the charging cable identification signal of charging-cable identification signal transmitting section 9 may be formed by varying the pulse duty cycle. Specifically, as shown in FIG. 1B, the information is varied by the duty cycle, and thereby, the identification code is transmitted.

Although the electric vehicle identification signal has been described as being transmitted via power supply line 7, the electric vehicle identification signal may be transmitted via pilot line 8, in which case transmitting section 13 transmits the electric vehicle identification signal via pilot line 8, and electric-vehicle identification signal receiving section 10 receives the electric vehicle identification signal. Because the noise on pilot line 8 is less than on power supply line 7 that supplies power to electric vehicle 3, transfer errors of the electric vehicle identification signal can be suppressed.

At S5 in FIG. 3A, the transmission of the charging cable identification signal may be stopped at the timing of reception of a reception response signal (ACK: acknowledgement) from electric vehicle 3 by electric-vehicle identification signal receiving section 10 with respect to the charging cable identification signal.

When electric-vehicle identification signal receiving section 10 cannot receive the electric vehicle identification signal (or the above-noted reception response signal) for a prescribed period of time, charging-cable identification signal transmitting section 9 may retransmit the charging cable identification signal to electric vehicle 3. Such retransmission makes it possible to suppress both charging stand 1 and electric vehicle 3 (or 2) going into the waiting-for-signal condition when receiving section 12 cannot receive the charging cable identification signal. That is, even if there is a problem in transmitting and receiving the above-noted signals, transition is possible into the connection sequence for charging control without a user charging electric vehicle 3 reconnecting the charging cable and electric vehicle 3.

It is preferable that information of the charging cable identification signal be changed each time the information is transmitted (or every several transmissions). Therefore, it is preferable that, at the time of retransmission, the charging cable identification signal also have information that is different from the charging cable identification signal transmitted before the retransmission. In this manner, even if the information of the charging cable identification signal were to be read out, that information is not always the same. Thus, rewriting the information of the charging cable identification signal makes it possible to increase the security of charging stand 1.

As described in detail above, the power supply apparatus of the present embodiment is a power supply apparatus to which a plurality of charging cables 4, 5 are connected and which is configured to supply power to electric vehicles 2, 3 via charging cables 4, 5. In addition, this power supply apparatus includes: charging-cable identification signal transmitting section 9 that transmits a charging cable identification signal to the electric vehicles 2, 3 via the charging cables 4, 5; electric-vehicle identification signal receiving section 10 that receives the electric vehicle identification signal and the charging cable identification signal from electric vehicles 2,3 via charging cables 4, 5; and control section 11 that charges electric vehicles 2, 3 when electric-vehicle identification signal receiving section 10 receives the electric vehicle identification signal and the charging cable identification signal.

The power supply apparatus transmits the charging cable identification signal to electric vehicles 2, 3 via charging cables 4, 5, receives the electric vehicle identification signal and the charging cable identification signal from electric vehicles 2, 3 via charging cables 4, 5, and charges electric vehicles 2, 3.

In the present embodiment, charging cables 4, 5 each include pilot line 8 and power supply line 7, charging-cable identification signal transmitting section 9 transmits the charging cable identification signal to electric vehicles 2, 3 via pilot lines 8, and charging stand 1 supplies power to electric vehicles 2, 3 via power supply lines 7.

In the present embodiment, electric-vehicle identification signal receiving section 10 receives the electric vehicle identification signal from the electric vehicles via power supply line 7 or pilot line 8.

In the present embodiment, when control section 11 detects the voltage on pilot line 8, charging-cable identification signal transmitting section 9 transmits the charging cable identification signal to electric vehicles 2, 3 via pilot lines 8.

In the present embodiment, when electric-vehicle identification signal receiving section 10 receives no reception response signal with respect to the electric vehicle identification signal or the charging cable identification signal within a prescribed amount of time, charging-cable identification signal transmitting section 9 retransmits the charging cable identification signal to electric vehicles 2, 3.

In this case, the retransmitted charging cable identification signal may have information that is different from the charging cable identification signal transmitted before the retransmission.

In the present embodiment, charging-cable identification signal transmitting section 9 forms the charging cable identification signal by a pulse signal. Specifically, charging-cable identification signal transmitting section 9 forms the charging cable identification signal by varying the pulse duty cycle.

As described above, the power supply apparatus of the present embodiment includes a charging stand having a plurality of charging cables and a power supplying section selectively supplying power to the charging cables, in which: each of the charging cables has a power supply line for charging an electric vehicle connected to the charging cable and a pilot line indirectly detecting, via the power supply line, that the power supplying section and the charging cable are connected to each other; the power supplying section has a charging-cable identification signal transmitting section that transmits to the pilot line a charging cable identification signal for each charging cable, an electric-vehicle identification signal receiving section that receives an electric vehicle identification signal sent as a reply from an electric vehicle via the power supply line, and a control section connected to the electric-vehicle identification signal receiving section and the charging-cable identification signal transmitting section. The control section is configured to recognize a charging cable identification signal from the electric vehicle identification signal received at the electric-vehicle identification signal receiving section, and charge the electric vehicle via the power supply line. Accordingly, even when a plurality of electric vehicles are connected to the charging stand, proper charging is performed.

That is, in the power supply apparatus of the present embodiment, each charging cable connected to the charging stand includes a power supply line that charges an electric vehicle connected to the charging cable and a pilot line that indirectly detects, via the power supply line, that the power supplying section and the charging cable are connected to each other.

The power supplying section includes a charging-cable identification signal transmitting section that transmits to the pilot line a charging cable identification signal for each charging cable, an electric-vehicle identification signal receiving section that receives an electric vehicle identification signal sent as a reply from an electric vehicle via the power supply line, and a control section connected to the electric-vehicle identification signal receiving section and the charging-cable identification signal transmitting section.

The control section is configured to recognize the charging cable identification signal from the electric vehicle identification signal received at the electric-vehicle identification signal receiving section and charge the electric vehicle via the power supply line. Thus, even when a plurality of electric vehicles are connected to the charging stand, no interference between the electric vehicle identification signals occurs. As a result, it is possible to properly judge which electric vehicle connected to a charging cable the electric vehicle identification signal received at the power supplying section is from, thereby enabling proper charging.

The present invention, therefore, can be expected to be applicable as an electric vehicle charging system.

The disclosure of Japanese Patent Application No. 2010-281596, filed on Dec. 17, 2010, including the specification, drawings, and abstract, is incorporated herein by reference in its entirety.

INDUSTRIAL APPLICABILITY

The power supply apparatus and the power supplying method of the present invention perform proper charging, even when a plurality of electric vehicles are connected to a charging stand, and are thus useful as an electric vehicle charging system.

REFERENCE SIGNS LIST

1 Charging stand (Power supply apparatus)
2, 3 Electric vehicle
4, 5 Charging cable
6 Power supplying section
7 Power supply line
8 Pilot line
9 Charging-cable identification signal transmitting section
10 Electric-vehicle identification signal receiving section
11 Control section
12 Receiving section
13 Transmitting section
14 Control section

The invention claimed is:

1. A power supply apparatus to which a plurality of charging cables are connected and which supplies power to an electric vehicle via a corresponding one of the charging cables, the apparatus comprising:
   a transmitter that transmits a charging cable identification signal to the electric vehicle via the charging cable;
   a receiver that receives an electric vehicle identification signal and the charging cable identification signal from the electric vehicle via the charging cable; and
   a controller that charges the electric vehicle upon reception of the electric vehicle identification signal and the charging cable identification signal by the receiver.

2. The power supply apparatus according to claim 1, wherein:
   each of the charging cables includes a pilot line and a power supply line;
   the transmitter transmits the charging cable identification signal to the electric vehicle via the pilot line; and
   the power supply line is used to supply power to the electric vehicle.

3. The power supply apparatus according to claim 2, wherein the receiver receives the electric vehicle identification signal from the electric vehicle via the power supply line.

4. The power supply apparatus according to claim 2, wherein the receiver receives the electric vehicle identification signal from the electric vehicle via the pilot line.

5. The power supply apparatus according to claim 2, wherein the transmitter transmits the charging cable identification signal to the electric vehicle via the pilot line when the controller detects a voltage on the pilot line.

6. The power supply apparatus according to claim 3, wherein the transmitter retransmits the charging cable identification signal to the electric vehicle when the receiver receives no reception response signal with respect to the electric vehicle identification signal or the charging cable identification signal within a prescribed amount of time.

7. The power supply apparatus according to claim 6, wherein the retransmitted charging cable identification signal has information that is different from a charging cable identification signal transmitted before the retransmission.

8. The power supply apparatus according to claim 1, wherein the transmitter forms the charging cable identification signal by a pulse signal.

9. The power supply apparatus according to claim 1, wherein the transmitter forms the charging cable identification signal by varying a pulse duty cycle.

10. A power supply method that supplies power to an electric vehicle via a corresponding one of a plurality of charging cables, the method comprising:
   transmitting a charging cable identification signal to the electric vehicle via the charging cable;
   receiving an electric vehicle identification signal and the charging cable identification signal from the electric vehicle via the charging cable; and
   charging the electric vehicle.

11. The power supply apparatus according to claim 4, wherein the transmitter retransmits the charging cable identification signal to the electric vehicle when the receiver receives no reception response signal with respect to the electric vehicle identification signal or the charging cable identification signal within a prescribed amount of time.

12. The power supply apparatus according to claim 11, wherein the retransmitted charging cable identification signal has information that is different from a charging cable identification signal transmitted before the retransmission.

* * * * *